`US005388170A`

United States Patent [19]
Heismann et al.

[11] Patent Number: 5,388,170
[45] Date of Patent: Feb. 7, 1995

[54] ELECTROOPTIC DEVICE STRUCTURE AND METHOD FOR REDUCING THERMAL EFFECTS IN OPTICAL WAVEGUIDE MODULATORS

[75] Inventors: Fred L. Heismann, Freehold; Steven K. Korotky, Toms River; John J. Veselka, Freehold, all of N.J.

[73] Assignee: AT&T Corp., Murray Hill, N.J.

[21] Appl. No.: 156,118

[22] Filed: Nov. 22, 1993

[51] Int. Cl.⁶ .............................................. G02B 6/34
[52] U.S. Cl. ............................................ 385/4; 385/8
[58] Field of Search ........................................ 385/1–10

[56] References Cited

U.S. PATENT DOCUMENTS

| | | | |
|---|---|---|---|
| 4,743,087 | 5/1988 | Utaka et al. | 385/2 |
| 5,088,097 | 2/1992 | Ono et al. | 385/2 |
| 5,218,468 | 6/1993 | Shaw | 385/2 |
| 5,247,382 | 9/1993 | Suzuki | 359/156 |

OTHER PUBLICATIONS

I. Sawaki et al., "Thermally Stabilized Z-Cut Ti:LiNbO₃ Waveguide Switch", Conference on Lasers and Electro-optics, San Francisco, Calif., Jun. 9–13, 1986, paper MF2, pp. 46–47.
Skeath et al., "Novel Electrostatic Mechanism in the Thermal Instability of Z-Cut LiNbO₃ Interferometers", *Appl. Phys. Lett.*, 49 (19), Nov. 10, 1986, pp. 1221–1223.
M. Seino et al., "20-GHz 3dB-Bandwidth Ti:LiNbO₃ Mach-Zehnder Modulator", European Conference on Optical Communications, Amsterdam, The Netherlands, 1990, paper ThG1.5.
Korotky et al., "High-Speed, Low Power Optical Modulator with Adjustable Chirp Parameter", Topical Meetings on Integrated Photonics Research, Monterey, Calif., Apr. 9–11, 1991, paper TuG2.
Veselka et al, "Sensitivity to RF Drive Power and the Temperature Stability of Mach-Zehnder Modulators", Topical Meetings on Integrated Photonics Research, New Orleans, La., Apr. 13–16, 1992, paper TuG4-1.

*Primary Examiner*—Rodney B. Bovernick
*Assistant Examiner*—John Ngo

[57] ABSTRACT

An interferometric modulator comprising a substrate of titanium-doped lithium niobate (Ti:LiNbO₃) having top and bottom surfaces and a waveguide formed in the top surface is disclosed. A conductive layer is formed on the bottom surface of the substrate and electrically coupled to a top-surface ground plane or simply to ground potential. The bottom surface conductive layer functions to thermally stabilize the modulator during operation.

15 Claims, 3 Drawing Sheets

ELECTROOPTIC DEVICE STRUCTURE AND METHOD FOR REDUCING THERMAL EFFECTS IN OPTICAL WAVEGUIDE MODULATORS

BACKGROUND OF THE INVENTION

1. Field of the Invention

The invention generally relates to the field of electrooptic materials, and more particularly, to an optical waveguide device structure and method for reducing the effects of temperature in waveguide modulators made on ferroelectric crystals, such as lithium niobate ($LiNbO_3$) or lithium tantalate ($LiTaO_3$).

2. Related Art

Electrooptic waveguide modulators are commonly used in optical communication systems, signal processing, sensors, and the like. These modulators may be optical intensity modulators, switches, phase or frequency shifters, polarization transformers, wavelength filters, and the like. A class of these modulators are made of ferroelectric materials, such as z-cut lithium niobate ($LiNbO_3$) or lithium tantalate ($LiTaO_3$). An operational shortcoming of these modulators is temperature dependence. (The terms device and modulator will be used interchangeably.)

Changes in temperature may be caused by a change in the ambient environment or, for example, a change in the temperature of the active region of the modulator caused by electrical dissipation of radio frequency drive power in the modulator's electrodes or substrate. Temperature changes may directly affect the modulator, or may affect it through changes in stress and the photoelastic effect. Changes in stress change the index of refraction of the material, and therefore the bias point phase and operation of the modulator.

Additionally, in ferroelectric crystals pyroelectric (e.g., $LiNbO_3$), the index of refraction may be changed through the pyroelectric effect, which changes the internal electric field acting upon the modulator waveguides.

However, devices based on modal interference between two single-mode waveguides, such as Mach-Zehnder type interferometers or directional couplers, are mainly sensitive only to changes of the differential index between two waveguides. Therefore, it is the symmetry of the device structure and the drive configuration that will greatly effect the manifested thermal sensitivity of the device (see "Sensitivity of RF Drive Power and the Temperature Stability of Mach-Zehnder Modulators," J. J. Veselka et al., Topical Meetings on Integrated Photonics Research, New Orleans, La., Apr. 13–16, 1992, paper TuG4, pp 200–201; and Skeath et al., "Novel Electrostatic Mechanism in the Thermal Instability of Z-Cut $LiNbO_3$ Interferometers," *Applied Physics Lett.* 49(19):1221–1223).

On z-cut $LiNbO_3$, the electric fields induced by the pyroelectric effect are predominantly in the direction perpendicular to the top surface of the device. Thus, bound charges are observed on the top surface (where the electrodes are normally located) as well as on the bottom surface. It is therefore assumed that devices fabricated on z-cut $LiNbO_3$ will be more sensitive to temperature variations than those fabricated on the x-cut orientation. While it is possible to reduce the effects of these electric fields on the modulation of the light in the waveguides, e.g., by choosing a symmetric electrode structure and using a large ground plane, most modulators still show considerable temperature dependence. Even worse, with Mach-Zehnder modulators, the inventors have observed fast and somewhat erratic changes in the switching curve of the modulator during and after cooling or heating of the entire modulator.

Thus, what is desired is a modulator structure capable of reducing the inherent temperature sensitivity discussed above. Prior methods employ an electrically conductive (semiconductive) layer covering the entire top surface of the device to equalize the distribution of the bound charges on the top of the crystal (see I. Sawaki et al., "Thermally Stabilized Z-Cut Ti:$LiNbO_3$ Waveguide Switch," Conference on Lasers and Electro-optics, San Francisco, Calif., Jun. 9–13, 1986, paper MF2, pp. 46–47; and M. Seino et at., "20-GHz 3dB-Bandwidth Ti:$LiNbO_3$ Mach-Zehnder Modulator," European Conference on Optical Communications, Amsterdam, The Netherlands, 1990, paper ThG 1.5). However, these methods do not prevent non-uniform accumulation of electric charges on the back surface of the device, which may lead to asymmetric electric field distributions in the modulator waveguides. Thus, what is needed is a device structure that screens the bound charges on the back surface of the device uniformly.

SUMMARY OF THE INVENTION

The present invention is directed to an electrooptic waveguide device having a conductive layer on the bottom surface of the modulator substrate. The bottom conductive (or semiconductive) electrode is electrically (or resistively) coupled to a top-surface ground plane to achieve temperature stability.

The present invention is specifically applicable to z-cut titanium-doped lithium niobate (Ti:$LiNbO_3$) modulators, but is equally applicable to other lattice cuts and materials, e.g., lithium tantalate ($LiTaO_3$).

In the preferred embodiment of the present invention, the bottom surface conductor layer is formed of metal or semiconductor material. This conductive layer is not only expected to reduce or eliminate erratic charge transfer to and from the bottom surface of the device, but also to equalize the electric field in the crystalline lattice of the substrate resulting from the pyroelectric effect.

In further embodiments of the present invention, the bottom surface conductive layer may be used in conjunction with a top-surface coating layer. Application of a semi-insulating film, such as indium tin-oxide (ITO), silicon (Si), or a polycrystalline silicon (polysilicon), over top of the modulator film interposed between the modulator electrodes and the top surface can further reduce temperature dependencies of such modulators.

The foregoing and other features and advantages of the present invention will be apparent from the following more particular description of the preferred embodiments of the invention, as illustrated in the accompanying drawings.

BRIEF DESCRIPTION OF THE DRAWINGS

The invention will be better understood if reference is made to the accompanying drawings in which.

In the figures, like reference numbers indicate identical or functionally similar features. Also in the figures, the left-most digit of each reference number corresponds to the figure in which the reference number is first used.

DETAILED DESCRIPTION OF THE PREFERRED EMBODIMENTS

Figure 1:
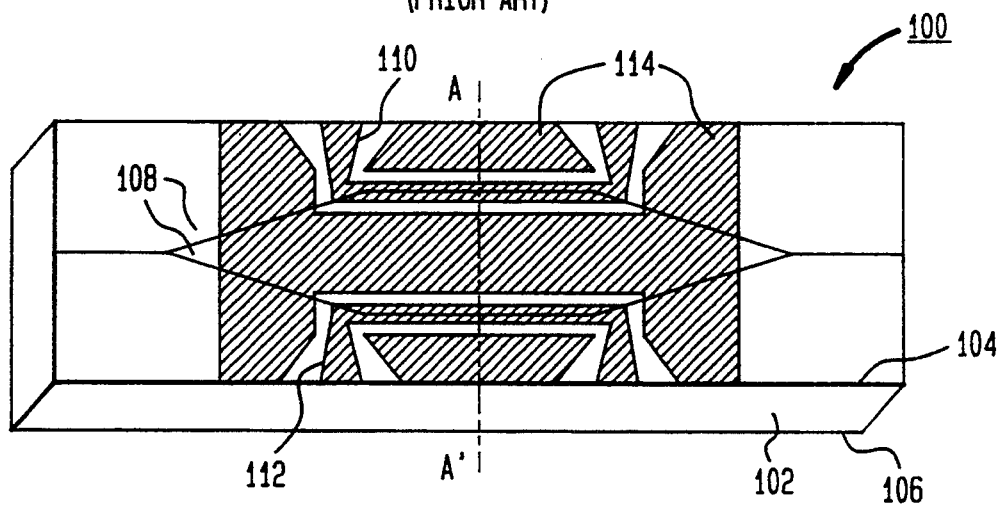
FIG. 1 shows a top, perspective view of a conventional interferometric waveguide modulator.
Figure 2:
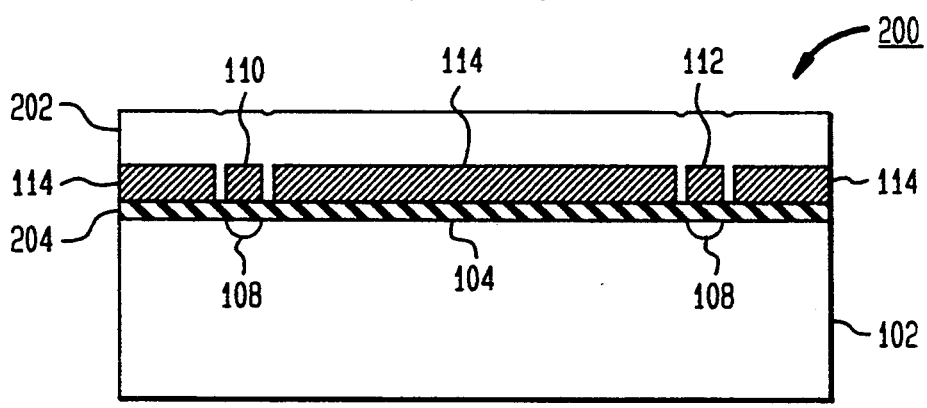
FIG. 2 shows a cross-sectional view of a conventional interferometric waveguide modulator having an indium tin-oxide coating.
Figure 3:
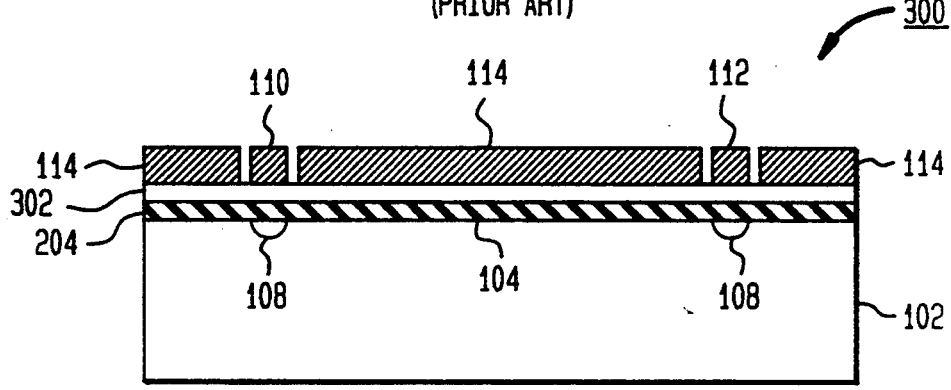
FIG. 3 shows a cross-sectional view of a conventional interferometric waveguide modulator having a silicon film formed on a top surface of the modulator substrate.

Examples of three conventional interferometric waveguide modulators will now be described with reference to FIGS. 1, 2 and 3. FIG. 1 shows a representative top view of a conventional Mach-Zehnder type interferometric waveguide modulator. FIG. 2 shows a representative cross-sectional view of a second conventional interferometric waveguide modulator deposited with a semi-insulating indium tin-oxide (ITO) film to improve temperature stability. FIG. 3 shows a representative cross-section of a third conventional interferometric waveguide modulator having a silicon film to improve temperature stability.

Turning now to the description of FIG. 1, a conventional interferometric waveguide modulator (hereinafter referred to as "modulator") 100 is shown formed on a substrate 102. The substrate 102 has a top surface 104 and a bottom surface 106. Waveguides 108 are formed in the top surface 104 of the modulator 100. First and second drive electrodes 110 and 112 are shown formed over the two waveguides 108. A common ground plane 114 is formed on the top surface 104 to produce the desired modulating electric fields in waveguides 108.

Based on the above description of a conventional modulator in connection with FIG. 1, two conventional approaches to reduce thermal dependency will now be described with reference to FIGS. 2 and 3. FIGS. 2 and 3 are both two cross-sectional views of conventional modulators taken through cross-sectional line A—A' of FIG. 1.

FIG. 2 shows a conventional modulator 200 having a semi-insulating film of indium tin-oxide (ITO) deposited over the top of modulator 200. The ITO film 202 is deposited by magnetron sputtering, or the like. A buffer layer 204 formed of silicon dioxide ($SiO_2$) is also included. Buffer layer 204 is formed in a conventional manner and separates metal electrodes 110, 112, and 114 from the optical fields in waveguides 108 to avoid attenuation of said optical fields. The ITO film 202 is thus formed over the drive electrodes 110 and 112, ground plane 114, and buffer layer 204. The ITO film is formed to approximately 1,000 Å in thickness and has a resistivity of $\geq 10^5 \Omega$ cm. The ITO film 204 has been used to improve temperature dependency of $LiNbO_3$ switching devices, and has been suggested for use with modulators such as Mach-Zehnder interferometric modulators. Such a conductive layer on top of the electrodes, however, may adversely effect high-frequency operation of such modulators. Moreover, ITO film 202 is unstable due to photoconductivity. Thus, another approach to solve the temperature dependency was developed. This further approach will now be discussed in connection with FIG. 3.

FIG. 3 shows a further conventional modulator 300 having a silicon film 302 formed on top of the buffer layer 204. Alternatively, the film 302 may be formed on polycrystalline silicon and formed to a thickness of approximately 1,000 Å. The film 302 may be formed using sputtering or other conventional techniques, as will become apparent to a person skilled in the semiconductor manufacturing art. Such a film should have a sheet resistivity of about $10^5 \Omega$ cm to evenly distribute the bound electric charges on the top surface of the device without reducing the electric field induced by the external drive voltage. Such a film, however, is difficult to fabricate. Moreover, it does not screen the surface charges on the back surface of the device, which may also lead to non-uniform field distributions in the device caused by the pyroelectric effect.

The preferred embodiment of the present invention will now be discussed in detail. While specific features, configurations and arrangements are discussed, it should be understood that this is done for illustration purposes only. A person skilled in the relevant art will recognize that other steps, configurations and arrangements may be used without departing from the spirit and scope of the invention.

Further background material concerning the physics of ferroelectric crystals may be found in a number of references including the books by Charles Kittel, titled: *Introduction to Solid State Physics*, John Wiley and Sons, Inc., New York (1971), and Ivan P. Kaminov, *An Introduction to Electrooptic Devices*, Academy Press, Inc., Orlando (1974), both of which are incorporated herein by reference. Additional information on the processing of $LiNbO_3$ may be found in the book chapter by S. K. Korotky and R. C. Alferness, titled: "Ti:$LiNbO_3$ Integrated Optic Technology" in L. D. Hutcheson (Editor), "Integrated Optical Circuits and Components," Marcel Dekker, Inc., New York (1987), pp. 169–227.

The inventors have observed that the conventional modulators discussed above still suffer operationally from temperature dependence. According to the present invention, the inventors have discovered that screening of surface charges emanating from the bottom surface of the modulator using an electrically grounded bottom-surface conductive layer can achieve an acceptable level of thermal stability.

Figure 4:
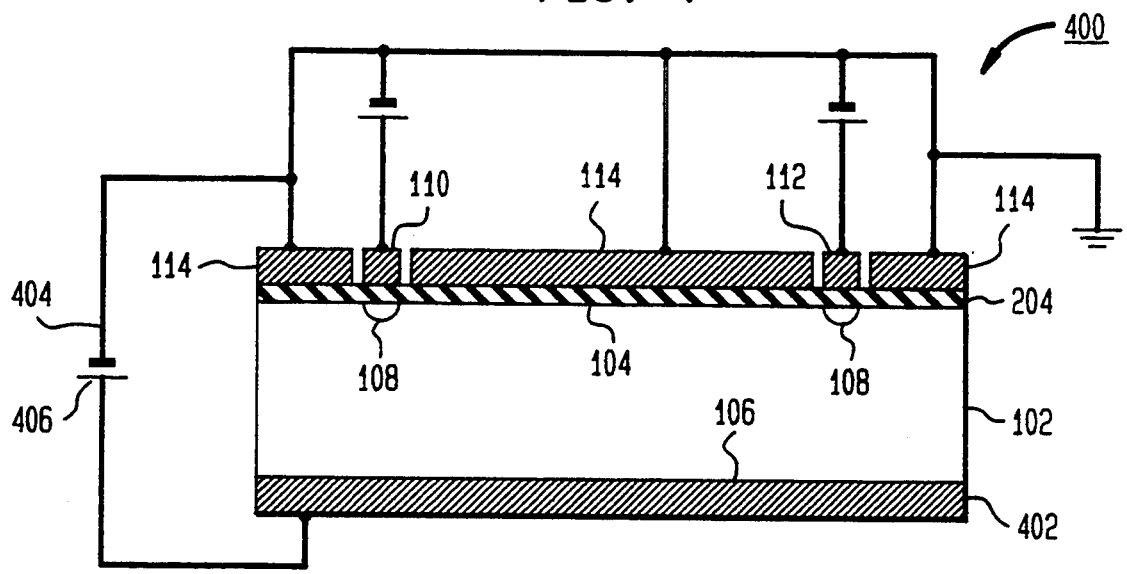
FIG. 4 shows an interferometric waveguide modulator in accordance with the preferred embodiment of the present invention.

FIG. 4 shows a modulator 400 having a bottom-surface conductive layer 402 according to the present invention. Conductive layer 402 is formed on the bottom surface 106 of the modulator 400 using sputtering or the like. The bottom conductive layer 402 may comprise a metal, such as aluminum, gold, or other conductive materials, such as semiconductors, suitable for depositing on the $LiNbO_3$ substrate 102. For example, the bottom conductive layer 402 is formed to a thickness of approximately 500 Å and should have a sheet resistivity of $10^5 \Omega$ cm or less.

According to the preferred embodiment of the present invention, the bottom surface conductive layer 402 is electrically coupled to electrical ground. An electrical connection 404 may be used to electrically couple the bottom surface conductive layer 402 to the top surface ground plane 114. The bottom surface conductive layer 402 and ground plane 114 may be directly connected to a source of ground potential, such as a grounded metal case of the modulator housing using an electrically conductive epoxy, or the like. Alternatively, the conductive layer 402 can be offset by a D.C. or A.C. voltage source 406. (Note that the terms top and bottom are used for ease of discussion only, and that their actual physical orientation is irrelevant for the purposes of describing the present invention.)

Comparative Results

Comparative results between a Mach-Zehnder modulator on z-cut Ti:LiNbO3 having a bottom surface conductive layer 402 (as in FIG. 4) and a reference modulator having an uncoated bottom surface will now be discussed. In testing the reference modulator, the bottom surface of the reference modulator was electrically isolated from its housing. Both modulators were simultaneously tested in a temperature-control chamber and exposed to a controlled heating and cooling cycle.

Figure 5:
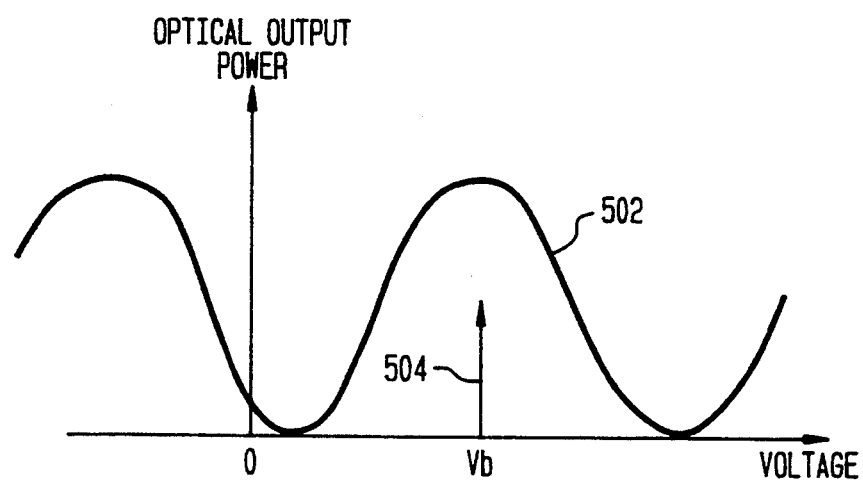
FIG. 5 shows a representative plot of optical output power of the modulator shown in FIG. 4.

The modulator according to the present invention and the reference modulator were operated with a 1.54 μm light source and variable voltages applied to the first and second drive electrodes 110 and 112. The voltages were automatically adjusted to track an arbitrarily maximum in the modulation switching curve, as plotted in a voltage versus optical power output curve 502 in FIG. 5. A voltage $V_b$ is shown generally at 504 as the voltage for maximum transmission. Normalized optical output power is shown on the ordinate and voltage is shown on the abscissa.

Figure 6A:
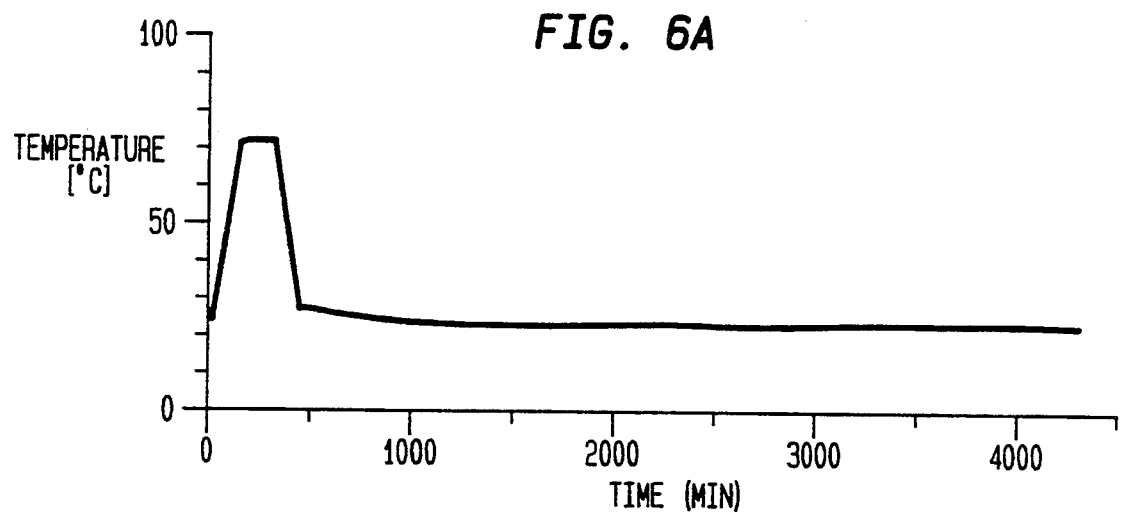
FIG. 6A shows a temperature cycle used in a comparative analysis for results shown in FIGS. 6B and 6C.
Figure 6B:
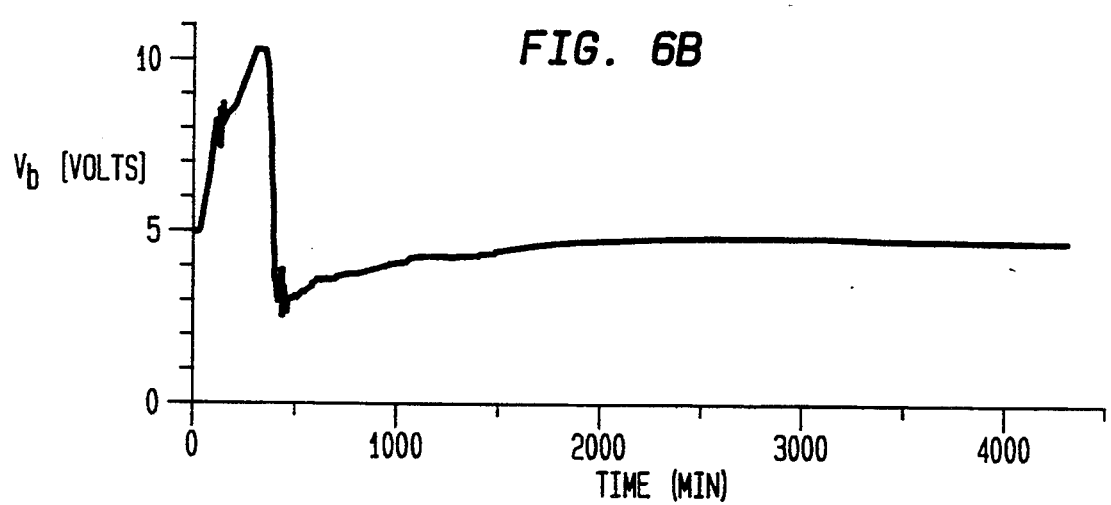
FIG. 6B shows the voltage required for maximum optical transmission plotted as a function of time during and after the temperature cycle shown in FIG. 6A for a modulator with an uncoated bottom surface.
Figure 6C:
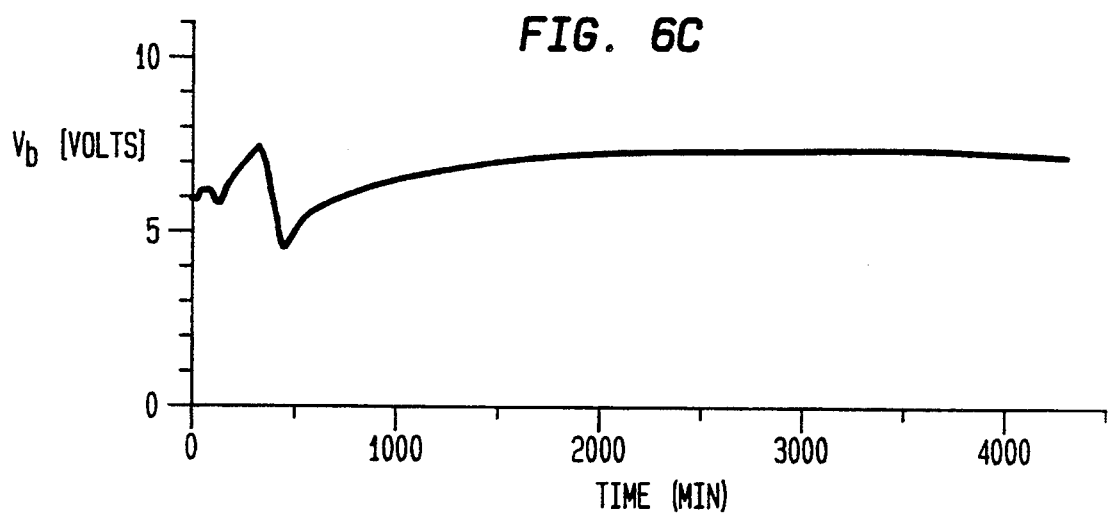
FIG. 6C shows the voltage required for maximum optical transmission plotted as a function of time during and after the temperature cycle shown in FIG. 6A for a modulator with a metal-coated and grounded bottom surface in accordance with the present invention.

In addition, FIGS. 6A through 6C collectively show the voltage required for maximum optical transmission plotted as a function of time during and after a temperature cycle. FIG. 6A shows the temperature cycle used for the comparative analysis shown in FIGS. 6B and 6C. In FIG. 6A, temperature is measured in degrees Celsius along the ordinate, and time is measured in minutes along the abscissa.

FIGS. 6B and 6C show the voltage required for maximum optical transmission ($V_b$) in volts along the ordinate for a modulator with an uncoated bottom surface (FIG. 6B) and a modulator according to the present invention with a metal-coated, grounded bottom surface (FIG. 6C). The results in FIGS. 6B and 6C clearly show that the modulator according to the present invention (FIG. 6C) having a metal coating on the back surface does not show erratic voltage jumps during the heating and cooling or at any time subsequent thereto. According to the present invention, the voltage changes due to the pyroelectric effect (temperature changes) are largely reduced by a factor of approximately 4 Volts compared to the uncoated device shown in FIG. 6B.

Although the invention has been described in connection with a z-cut Ti:LiNbO3 substrate, the present invention is applicable for achieving temperature stability with x-cut (y- and z-propagation) modulators and other device structures.

In another embodiment of the present invention, conductive layers may be formed on the side walls of the device, in addition to the bottom surface. The side wall, or edge, conductive layers can be formed integral with, or simply electrically coupled to the bottom conductive layer. The edge conductive layers should adhere to the thickness and resistivity guidelines described above for the bottom conductive layer.

While various embodiments of the present invention have been described above, it should be understood that they have been presented by way of example, and not limitation. It will be apparent to persons skilled in the relevant art that various changes in form and detail may be made therein without departing from the spirit and scope of the invention. Thus, the present invention should not be limited by any of the above-described exemplary embodiments, but should be defined only in accordance with the following claims and their equivalents. All cited patent documents and publications in the above description are incorporated herein by reference.

What is claimed is:

1. An optical device comprising:
   a substrate having top and bottom surfaces;
   a conductive layer formed on said top surface;
   a waveguide formed in said top surface;
   a plurality of modulator electrodes formed over at least a portion of said waveguide on said top surface; and
   a conductive layer means formed on said bottom surface of said substrate for stabilizing operation of said optical device due to temperature changes.

2. The device according to claim 1, wherein said conductive layer means on said bottom surface is electrically coupled to said conductive layer on said top surface.

3. The device according to claim 1, wherein said conductive layer means on said bottom surface and said conductive layer on said bottom surface are connected to electrical ground.

4. The device according to claim 1, wherein the device is a Mach-Zehnder interferometric modulator.

5. The device according to claim 1, wherein said substrate comprises LiNbO3.

6. The device according to claim 5, wherein said substrate is z-cut LiNbO3.

7. The device according to claim 5, wherein said waveguide comprises Ti-doped regions.

8. The device according to claim 1, wherein an insulating layer is formed between said substrate and said conductive layer on said top surface.

9. The device according to claim 8, wherein said insulating layer is SiO2.

10. The device according to claim 1, wherein said conductive layer on said top surface and said conductive layer means on said bottom surface comprise a metal.

11. The device according to claim 1, wherein said conductive layer means on said bottom surface comprise a semiconductive material.

12. The device according to claim 1, wherein said conductive layer means on said bottom surface is connected to a voltage source.

13. The device according to claim 1, further comprising further conductive layers means on side surfaces of said substrate for stabilizing operation of said optical device due to temperature changes.

14. The device according to claim 13, wherein said conductive layers means on side surfaces are electrically coupled to said conductive layer means on said bottom surface.

15. A method for stabilizing operation of an interferometer due to temperature dependence, the interferometer comprising a substrate having top and bottom surfaces, a conductive layer formed on said top surface, a waveguide formed in the top surface, and a plurality of modulator electrodes formed over at least a portion of the waveguide, comprising the steps of:

forming a conductive layer on the bottom surface of the substrate;

electrically coupling said conductive layer on the bottom surface to said conductive layer on said top surface; and electrically grounding said conductive layer on said bottom surface.

* * * * *